US008060883B1

(12) United States Patent
Rao et al.

(10) Patent No.: US 8,060,883 B1
(45) Date of Patent: Nov. 15, 2011

(54) SYSTEM FOR MANAGING AND PROVIDING EXPANDABLE RESOURCE RESERVATIONS IN A TREE HIERARCHY

(75) Inventors: Anil Rao, San Jose, CA (US); Carl Waldspurger, Palo Alto, CA (US); Xiaoxin Chen, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 1188 days.

(21) Appl. No.: 11/707,416

(22) Filed: Feb. 16, 2007

(51) Int. Cl.
*G06F 9/46* (2006.01)
*G06F 15/173* (2006.01)

(52) U.S. Cl. .................. 718/104; 718/102; 709/226

(58) Field of Classification Search .................. None
See application file for complete search history.

(56) References Cited

U.S. PATENT DOCUMENTS

| | | | | | |
|---|---|---|---|---|---|
| 5,682,530 | A | * | 10/1997 | Shimamura | 718/104 |
| 5,889,956 | A | * | 3/1999 | Hauser et al. | 709/226 |
| 6,601,083 | B1 | * | 7/2003 | Reznak | 718/104 |
| 6,725,456 | B1 | * | 4/2004 | Bruno et al. | 718/102 |
| 6,859,926 | B1 | * | 2/2005 | Brenner et al. | 718/100 |
| 6,952,828 | B2 | * | 10/2005 | Greene | 718/104 |
| 7,032,222 | B1 | * | 4/2006 | Karp et al. | 718/104 |
| 7,111,297 | B1 | * | 9/2006 | Sankaranarayan et al. | 718/104 |
| 7,543,296 | B2 | * | 6/2009 | Hunt et al. | 718/104 |
| 7,698,430 | B2 | * | 4/2010 | Jackson | 709/226 |
| 7,784,053 | B2 | * | 8/2010 | Casey et al. | 718/104 |
| 2001/0029519 | A1 | * | 10/2001 | Hallinan et al. | 709/104 |
| 2006/0190482 | A1 | * | 8/2006 | Kishan et al. | 707/103 Y |
| 2007/0266388 | A1 | * | 11/2007 | Jackson | 718/104 |
| 2008/0301673 | A1 | * | 12/2008 | Kawasaki et al. | 718/1 |
| 2010/0192157 | A1 | * | 7/2010 | Jackson | 718/104 |

OTHER PUBLICATIONS

VMworld2005 Virtualize now, Las Vegas, Oct. 18, 2005. "PAC485 Managing Datacenter Resources Using the VirtualCenter Distributed Resource Scheduler" Carl Waldspurger, Principal Engineer, R&D.

* cited by examiner

*Primary Examiner* — Meng An
*Assistant Examiner* — Tammy Lee

(57) ABSTRACT

Described herein are approaches to managing expandable resource reservations. In one approach, a method is described in which an attempt is made to change a resource reservation from a first amount to a second amount. The second amount is examined to determine whether it exceeds a reservation limit. The second amount is compared with available resources, and reserved.

18 Claims, 11 Drawing Sheets

VMW-A151

System 2112

VMW-A151

Tree Hierarchy 3000

VMW-A151

Tree 5000

VMW-A151

Tree 5100

Tree 5200

Flowchart 6000

VMW-A151

System 7112

VMW-A151

Flowchart 8000

VMW-A151

SYSTEM FOR MANAGING AND PROVIDING EXPANDABLE RESOURCE RESERVATIONS IN A TREE HIERARCHY

BACKGROUND

1. Field of the Invention

Embodiments of the present invention pertain to resource reservation.

2. Related Art

The advantages of virtual machine technology have become widely recognized. Among these advantages is the ability to run multiple virtual machines on a single host platform. This makes better use of the capacity of the hardware, while still ensuring that each user enjoys the features of a "complete" computer. Depending on how it is implemented, virtualization can also provide greater security, since the virtualization can isolate potentially unstable or unsafe software so that it cannot adversely affect the hardware state or system files required for running the physical (as opposed to virtual) hardware.

As is well known in the field of computer science, a virtual machine (VM) is an abstraction—a "virtualization"—of an actual physical computer system. FIG. 1 shows one possible arrangement of a computer system 700 that implements virtualization. A virtual machine (VM) or "guest" 200 is installed on a "host platform," or simply "host," which will include system hardware, that is, a hardware platform 100 of computer system 700, and one or more layers or co-resident components comprising system-level software, such as an operating system or similar kernel, or a virtual machine monitor or hypervisor (see below), or some combination of these. The system hardware typically includes one or more processors 110, memory 130, some form of mass storage 140, and various other devices 170. Additionally, an operating system, such as Console Operating System 420, and hosted application(s) 430, is shown with an optional coupling to system hardware 100.

Each VM 200 will typically have both virtual system hardware 201 and guest system software 202. The virtual system hardware typically includes at least one virtual CPU 210, virtual memory 230, at least one virtual disk 240, and one or more virtual devices 270. Note that a disk—virtual or physical—is also a "device," but is usually considered separately because of the important role of the disk. All of the virtual hardware components of the VM 200 may be implemented in software using known techniques to emulate the corresponding physical components. The guest system software 202 includes a guest operating system (OS) 220 and drivers 224 as needed for the various virtual devices 270.

Note that a single VM 200 may be configured with more than one virtualized processor. To permit computer systems to scale to larger numbers of concurrent threads, systems with multiple CPUs have been developed. These symmetric multiprocessor (SMP) systems are available as extensions of the PC platform and from other vendors. Essentially, an SMP system is a hardware platform that connects multiple processors to a shared main memory and shared I/O devices. Virtual machines may also be configured as SMP VMs. FIG. 1, for example, illustrates multiple virtual processors 210-0, 210-1, . . . , 210-m (VCPU0, VCPU1, . . . , VCPUm) within the VM 200.

Yet another configuration is found in a so-called "multicore" architecture, in which more than one physical CPU is fabricated on a single chip, with its own set of functional units (such as a floating-point unit and an arithmetic/logic unit ALU), and can execute threads independently; multi-core processors typically share only very limited resources, such as some cache. Still another technique that provides for simultaneous execution of multiple threads is referred to as "simultaneous multi-threading," in which more than one logical CPU (hardware thread) operates simultaneously on a single chip, but in which the logical CPUs flexibly share some resource such as caches, buffers, functional units, etc.

If the VM 200 is properly designed, applications 260 running on the VM 200 will function as they would if run on a "real" computer, even though the applications are running at least partially indirectly, that is via the guest OS 220 and virtual processor(s) 210-0, 210-1, . . . , 210-m. Executable files will be accessed by the guest OS 220 from the virtual disk 240 or virtual memory 230, which will be portions of the actual physical disk 140 or memory 130 allocated to that VM. Once an application 260 is installed within the VM 200, the guest OS 220 retrieves files from the virtual disk 240 just as if the files had been pre-stored as the result of a conventional installation of the application 260. The design and operation of virtual machines, such as VM 200, are well known in the field of computer science.

Some interface is generally required between the guest software within a VM 200 and the various hardware components and devices in the underlying hardware platform 100. This interface—which may be referred to generally as "virtualization software"—may include one or more software components and/or layers, possibly including one or more of the software components known in the field of virtual machine technology as "virtual machine monitors" (VMMs) 300, . . . , 300-n, "hypervisors," or virtualization "kernels" 600. Because virtualization terminology has evolved over time and has not yet become fully standardized, these terms do not always provide clear distinctions between the software layers and components to which they refer. For example, "hypervisor" is often used to describe both a VMM 300 and a kernel 600 together, either as separate but cooperating components or with one or more VMMs 300, . . . , 300-m incorporated wholly or partially into the kernel 600 itself; however, "hypervisor" is sometimes used instead to mean some variant of a VMM 300 alone, which interfaces with some other software layer(s) or component(s) to support the virtualization. Moreover, in some systems, some virtualization code is included in at least one "superior" VM 200 to facilitate the operations of other VMs. Furthermore, specific software support for VMs 200, . . . , 200-n may be included in the host OS itself.

Moreover, FIG. 1 shows virtual machine monitors 300, . . . , 300-n that appear as separate entities from other components of the virtualization software. Furthermore, some software components used to implemented one illustrated embodiment of the invention are shown and described as being within a "virtualization layer" located logically between all virtual machines and the underlying hardware platform and/or system-level host software. This virtualization layer can be considered part of the overall virtualization software, although it would be possible to implement at least part of this layer in specialized hardware. The illustrated embodiments are given only for the sake of simplicity and clarity and by way of illustration—as mentioned above, the distinctions are not always so clear-cut.

The various virtualized hardware components in the VM, such as the virtual CPU(s) 210-0, 210-1, . . . , 210-m, the virtual memory 230, the virtual disk 240, and the virtual device(s) 270, are shown as being part of the VM 200 for the sake of conceptual simplicity. In actuality, these "components" are usually implemented as software emulations 330 included in the VMM 300. One advantage of such an arrangement is that the VMM 300 may (but need not) be set up to expose "generic" devices, which facilitate VM 200 migration and hardware platform-independence.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS 220 could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software.

For some, para-virtualization implies that the guest OS 220 (in particular, its kernel) is specifically designed to support such an interface. According to this view, having, for example, an off-the-shelf version of Microsoft Windows XP as the guest OS 220 would not be consistent with the notion of para-virtualization. Others define para-virtualization more broadly to include any guest OS 220 with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, this invention is not restricted to use in systems with any particular "degree" of virtualization and is not to be limited to any particular notion of full or partial ("para-") virtualization.

In addition to the sometimes fuzzy distinction between full and partial (para-) virtualization, two arrangements of intermediate system-level software layer(s) are in general use—a "hosted" configuration and a non-hosted configuration (which is shown in FIG. 1). In a hosted virtualized computer system, an existing, general-purpose operating system forms a "host" OS that is used to perform certain input/output (I/O) operations, alongside and sometimes at the request of the VMM 300. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

As illustrated in FIG. 1, in many cases, it may be beneficial to deploy VMMs 300, . . . , 300-*n* on top of a software layer—a kernel 600—constructed specifically to provide efficient support for the VMs 200, . . . , 200-*n*. This configuration is frequently referred to as being "non-hosted." Compared with a system in which VMMs 300, . . . , 300-*n* run directly on the hardware platform, use of a kernel 600 offers greater modularity and facilitates provision of services (for example, resource management) that extend across multiple virtual machines. Compared with a hosted deployment, a kernel 600 may offer greater performance because it can be co-developed with the VMM 300 and be optimized for the characteristics of a workload consisting primarily of VMs/VMMs. The kernel 600 also handles any other applications running on it that can be separately scheduled, as well as a console operating system that, in some architectures, is used to boot the system and facilitate certain user interactions with the virtualization software.

Note that the kernel 600 is not the same as the kernel that will be within the guest OS 220—as is well known, every operating system has its own kernel. Note also that the kernel 600 is part of the "host" platform of the VM/VMM as defined above even though the configuration shown in FIG. 1 is commonly termed "non-hosted;" moreover, the kernel may be both part of the host and part of the virtualization software or "hypervisor." The difference in terminology is one of perspective and definitions that are still evolving in the art of virtualization.

Resource Management

In many computing environments, the actual resources that make up the environment are shared between many different consumers of those resources. This resource sharing scenario is particularly obvious in the case of virtualized computing, where several different complete systems may share a single physical host, but it is common across the computing field.

In most resource scenarios, a group of consumers will attempt to use the resources of the environment. The nature of these consumers may vary, such as multiple virtual machines in a virtualization environment, or multiple processes, or multiple sub-features of a single application, or any combination or permutation of these or other consumers. To handle these competing interests, a common technique is to use resource reservation. By reserving resources for a particular consumer, a minimum guarantee of service is established.

SUMMARY

Described herein are approaches to managing expandable resource reservations. In one approach, a method is described in which an attempt is made to change a resource reservation from a first amount to a second amount. The second amount is examined to determine whether it exceeds a reservation limit. The second amount is compared with available resources, and reserved.

In another approach, computer readable program code is used to execute a method of managing resource reservation in a tree hierarchy. A reservation request is received from a child node, and includes a desired change in a current reservation associated with that child node. It is determined whether that change is allowable. Resources associated with a parent node are compared with the change, and reserved, if they are sufficient for the change. A second reservation request is generated, and includes a desired change in a current reservation associated with the parent node.

Another approach details a method of providing expandable resource reservations. The method includes defining a minimum resource reservation for a consumer. The method also describes reserving the minimum resource reservation for the consumer. Additionally, the method includes requesting an expanded resource reservation for the consumer, and determining if an amount of resources are available that would satisfy the expanded resource reservation. The method involves reserving the expanded resource reservation for the consumer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

DETAILED DESCRIPTION

Figure 1:
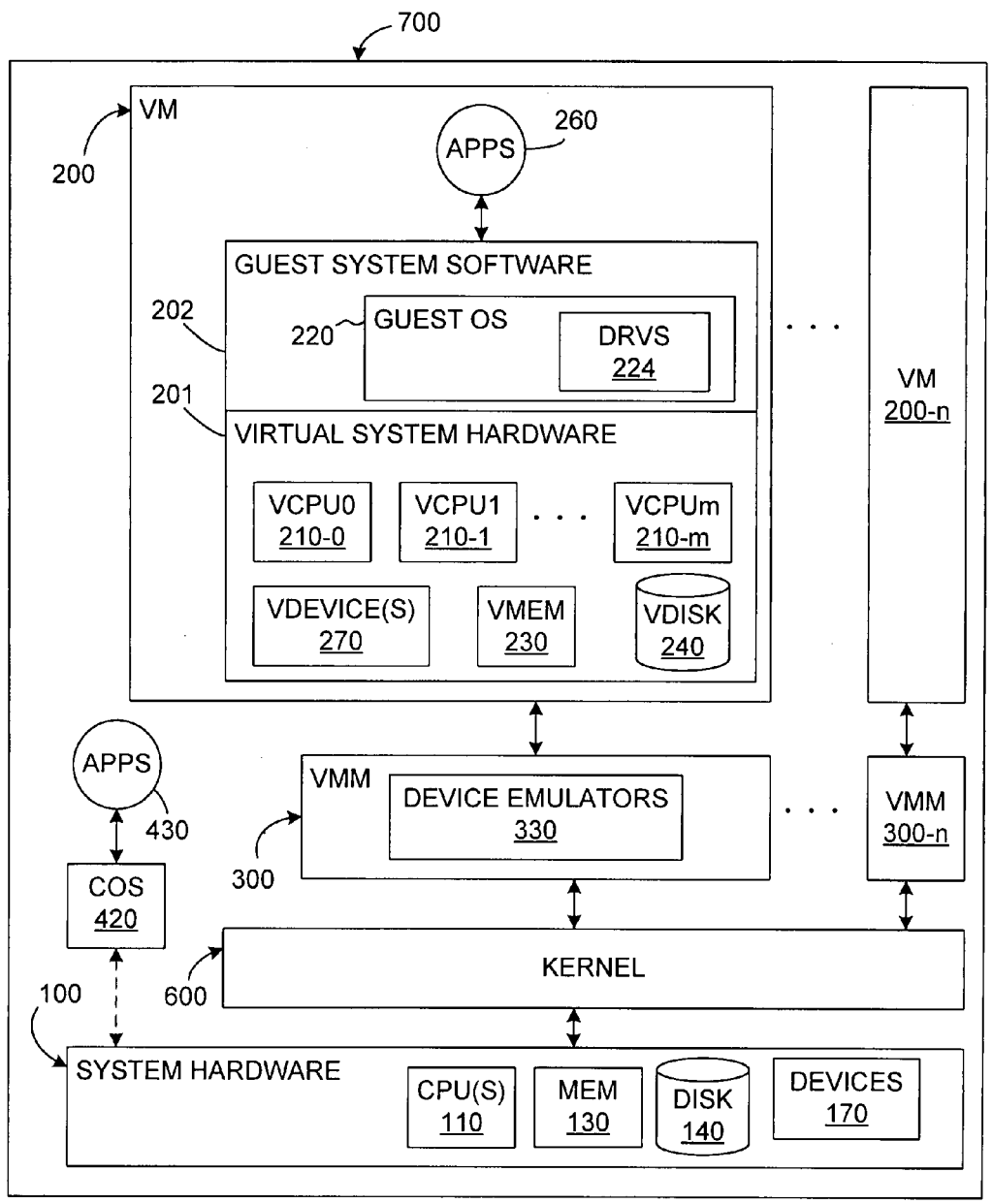
FIG. 1 is a diagram of an exemplary virtualized computer system with which embodiments of the present technology may be practiced.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternatives, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIG. 6) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc. that perform particular tasks or implement particular abstract data types.

Typically the functionality of the program modules may be combined or distributed as desired in various embodiments.

It is understood that the following embodiments are exemplary in nature. Embodiments of the present invention are well suited to application across a wide range of computers, virtual systems, networks, and storage protocols. Embodiments of the present invention may be used in both hosted and non-hosted virtualized computer systems, and regardless of the degree of virtualization and the systems. Embodiments may be used in applications in which the virtual machines have any number of physical and/or logical virtualized processors. Embodiments of the present invention may be implemented in numerous locations, including as part of a computer systems primary operating system, both where the OS is designed to support virtual machines, and where it is not. Additionally, embodiments of the present invention may be implemented in software, in hardware, or in some combination thereof, e.g., in processor architectures intended to provide hardware support for virtual machines.

Exemplary Computing System

Figure 2:
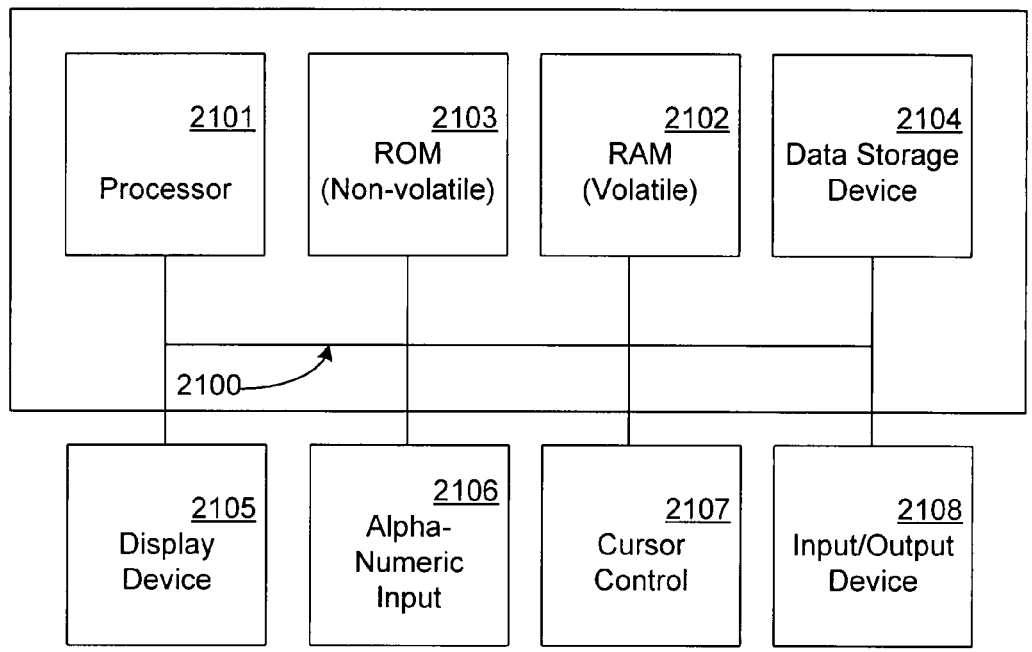
FIG. 2 depicts a block diagram of a computer system, upon which embodiments of the present invention may be implemented.

Referring first to FIG. 2, a block diagram of an exemplary computer system 2112 is shown. It is appreciated that computer system 2112 described herein illustrates an exemplary configuration of an operational platform upon which embodiments of the present invention can be implemented. Nevertheless, other computer systems with differing configurations can also be used in place of computer system 2112 within the scope of the present invention. That is, computer system 2112 can include elements other than those described in conjunction with FIG. 2.

Computer system 2112 includes an address/data bus 2100 for communicating information, a central processor 2101 coupled with bus 2100 for processing information and instructions; a volatile memory unit 2102 (e.g., random access memory [RAM], static RAM, dynamic RAM, etc.) coupled with bus 2100 for storing information and instructions for central processor 2101; and a non-volatile memory unit 2103 (e.g., read only memory [ROM], programmable ROM, flash memory, etc.) coupled with bus 2100 for storing static information and instructions for processor 2101. Computer system 2112 may also contain an optional display device 2105 coupled to bus 2100 for displaying information to the computer user. Moreover, computer system 2112 also includes a data storage device 2104 (e.g., disk drive) for storing information and instructions. In some embodiments, an interconnect or other component communications protocol is utilized, in addition to or in place of bus 2100. Moreover, in some embodiments, system 2112 may comprise multiple processors 2101, and/or a processor 2101 may include multiple programmatic cores.

Also included in computer system 2112 is an optional alphanumeric input device 2106. Device 2106 can communicate information and command selections to central processor 2101. Computer system 2112 also includes an optional cursor control or directing device 2107 coupled to bus 2100 for communicating user input information and command selections to central processor 2101. Computer system 2112 also includes signal communication interface (input/output device) 2108, which is also coupled to bus 2100, and can be a serial port. Communication interface 2108 may also include wireless communication mechanisms. Using communication interface 2108, computer system 2112 can be communicatively coupled to other computer systems over a communication network such as the Internet, intranet (e.g., a local area network), wireless network, or wireless mesh network.

Organization of a Resource Sharing Environment

In different embodiments, different approaches can be utilized to organize a resource sharing system. One of the most basic approaches is a "flat" partitioning scheme, where every consumer gets resources directly from the system's entire pool. In some embodiments, e.g., where a consumer needs a certain amount of resources in order to operate, a reservation system is utilized. A reservation, in some such embodiments, is a guarantee to the consumer that a certain level of resources will be available for its use. This basic approach can be enhanced through the use of resource groups or pools, where several consumers will be grouped together into a single pool, and resources are reserved for the entire pool, and subdivided by an administering agent for the resource pool.

Figure 3:
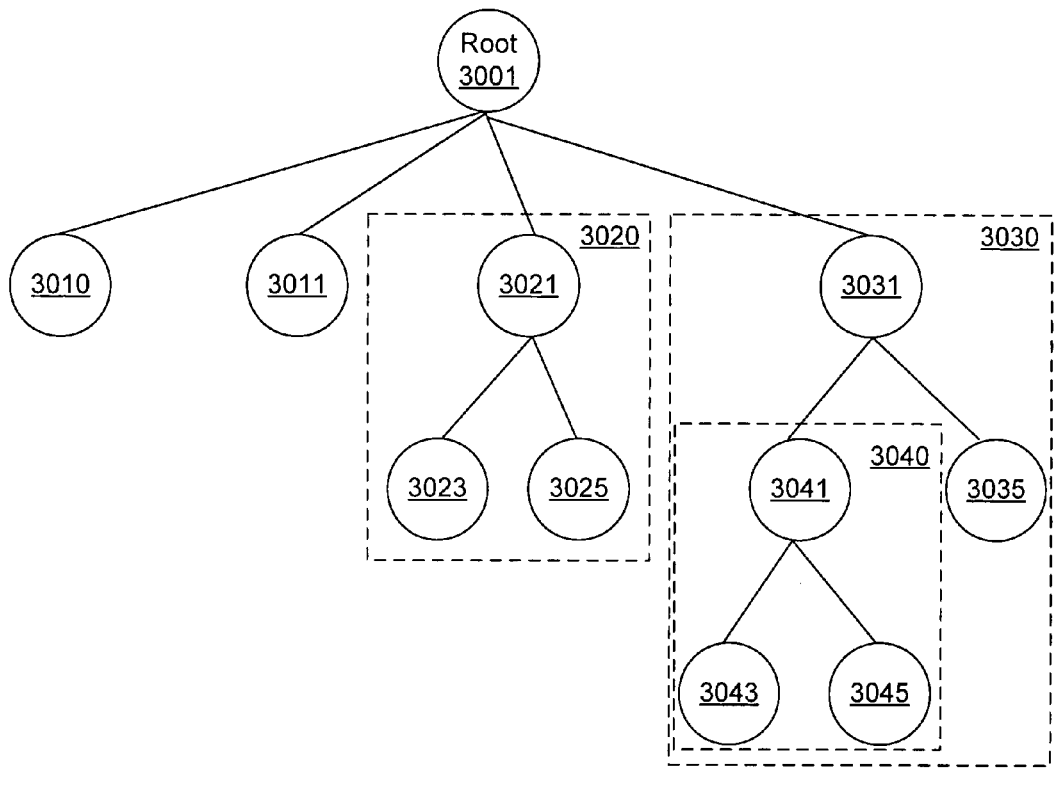
FIG. 3 depicts a tree hierarchy partitioning scheme, in accordance with one embodiment.

A useful organizational scheme is a tree hierarchy partitioning scheme, as shown in FIG. 3. In its simplest form, a tree hierarchy begins with a single node, e.g., a root node, which may represent a resource manager for the system. The tree branches at the root node into several children, each of which may reserve some portion of the resources available on the system by their parent node, the resource manager. Some or all of those children may, in turn, have children of their own, and so on. It is understood that, in some embodiments, a reservation may be set at zero; such embodiments are well-suited for use where additional controls, e.g., priorities or shares, are utilized. A tree based partitioning scheme can incorporate the concept of hierarchical resource pools, e.g., by reserving resources for a particular parent node to distribute to its children. More complex organizational schemes also exist, e.g., a directed acyclic graph, where each child node may have multiple parent nodes.

In some embodiments, a controlling rule in managing a resource reservation system is that the total of all reservations across the system is less than or equal to the total resources available to the system. Reservations are used to provide a minimum guarantee to a consumer, that it will have at least that reserved amount of resources available. If the reservations are allowed to exceed the total resources of the system, those minimum guarantees are no longer valid.

It should be noted that, for any particular system, there may be more than one type of resource managed by a resource manager. For example, reservations for processor access, memory access, and network interface access may all be separately managed. Embodiments are well suited to applications involving management of any type or number of resources.

With reference to FIG. 3, an exemplary tree hierarchy 3000 is depicted, in accordance with one embodiment. While tree hierarchy 3000 is shown as incorporating specific, enumerated features, it is understood that embodiments are well suited to application with fewer, additional, or different features or configurations.

As shown, tree hierarchy 3000 begins from the root node 3001. Root node 3001, in this embodiment, is a representation of the total resources available to the system represented by tree hierarchy 3000. In one embodiment, where the underlying system is a single, monolithic computing platform, e.g., system 2112, root node 3001 may have the available resources of that one system to manage. In another embodiment, where the underlying system is a cluster of computing platforms, root node 3001 may represent the aggregate of the resources available, e.g., the sum of the resources each platform has made available for the cluster. In different embodiments, different organizations of resources are utilized.

Root node 3001 has four children, as shown: nodes 3010, 3011, 3021, and 3031. In one embodiment, each of these child nodes may be an actual consumer, e.g., a process or virtual machine, or may be a resource pool, or may be both consumer and effectively a resource pool. In the depicted embodiment, nodes 3010 and 3011 are childless nodes. Node 3021 has two direct children, nodes 3023 and 3025; these nodes are members of a resource pool, e.g., resource pool 3020. Similarly, node 3031 has two direct children, nodes 3035 and 3041; this branch of the tree could be viewed as a single resource pool, resource pool 3030. Node 3041 also has two children, nodes 3043 and 3045; here, the resource pools nest, e.g., node 3041 and its children are part of resource pool 3040, which is entirely contained by resource pool 3030.

Whether applied to flat or tree-based systems, traditional resource reservation schemes suffer from a number of shortcomings. In a flat system, reservations are typically made when a consumer becomes active; in some situations, this is similar to the node being added to the root resource pool. In a tree system, a consumer is added to an already-existing intermediate node, e.g., representing a resource pool. In this latter case, in order to guarantee that a consumer may be added to the resource pool at a later time, the resource pool needs to reserve resources for all of its potential children's potential requirements. Not only is this difficult to pre-determine, but the resources for that pool are effectively statically partitioned, as they are being held to satisfy a potential child's demands. In a complex system, such as a particularly wide and/or deep tree hierarchy, reservation management becomes more complex. As reservations are parceled out to various resource pools across the system, and further subdivided within those resource pools, the resources of the system are effectively partitioned off between many consumers.

Additionally, as the tree structure becomes complex, admission control constrains structural changes to the tree, e.g., it may become impossible to rearrange nodes within the tree structure, while maintaining the reservations for every node within the tree. If, for example, an attempt was made to move node 3045 to be a child of node 3025, rather than node 3041, that move may be impossible, if the resources of the system were already completely reserved by existing resource pools and consumers.

Further, these traditional resource reservation schemes do not make efficient use of idling resources. Reservations are processed, and resources reserved, when a node is first brought into the tree, e.g., a process starts, or a virtual machine is powered on. Those resources may not be used by the consumer for some time, but they are already unavailable to the remainder of the system. This is inefficient, in that these resources could be used by other portions of the system until they were actually needed by the consumer.

Expandable Reservations

In the following embodiments, an approach to resource reservation and management is described which seeks to address these limitations. In some of these embodiments, a resource management scheme is utilized, which allows for expandable reservations for consumers. In one such embodiment, reservations are allowed to range from a minimum reservation value to a maximum reservation limit. The minimum reservation provides a minimum guarantee of resources for the consumer. If the consumer wishes to reserve more resources at a later time, it may be able to do so, up to its maximum reservation limit, provided the system has those resources available. By allowing reservations to expand, such embodiments reduce the need for a consumer to reserve all the resources it could potentially need up front; instead, the consumer, or the resource pool the consumer belongs to, can increase the reservation as actual needs require.

In some embodiments, a nested approach to resource reservation is utilized. In such embodiments, a child node will seek to expand its reservation. If that child node's parent has those resources already reserved, the child's reservation succeeds. If the node's parent does not have those resources already reserved, the parent, in turn, will seek to expand its reservation, and so on until either adequate resources are reserved, or the attempt to expand the reservation fails.

In some of these embodiments, expandable reservations offer substantial flexibility for efficiently managing minimum resource guarantees. If, for example, the minimum reservation is set equal to the reservation limit, the functionality of the traditional resource reservation scheme is preserved, with the consumer having a set amount of reserved resources. By contrast, if the minimum reservation is set to zero, and the maximum reservation is set equal to the total resources of the system, the consumer is initially reserved no resources, but allowed to expand without restraint; this consumer will not waste any guaranteed resources of the system, but will still be able to reserve resources as and when required, provided that its parent has those resources available. An additional advantage to this approach, in some embodiments, is that changes in the resources available to the tree may be effectively dispersed through the tree, without needing to modify the reservations of all of the nodes. Between these extremes, combinations of minimum reservations and reservation limits can be used to provide certain minimum guarantees, while allowing additional reservations to occur, when system resources allow.

Consumer Attributes

In some embodiments, each consumer or node in the hierarchy, has a number of associated attributes. A number of attributes are specified below, in Table 1. These attributes may be defined for each consumer node, or may be derived from other attributes. The relationship between these attributes is depicted in FIGS. 4a and 4b.

TABLE 1

| Attribute | Symbol | Description |
| --- | --- | --- |
| Limit | L | Maximum amount of resources that may be provided to the node |
| Reservation | R | Minimum amount of resources guaranteed to the node |
| Effective Reservation | ER | Current amount of resources reserved by the node |

Figure 4A:
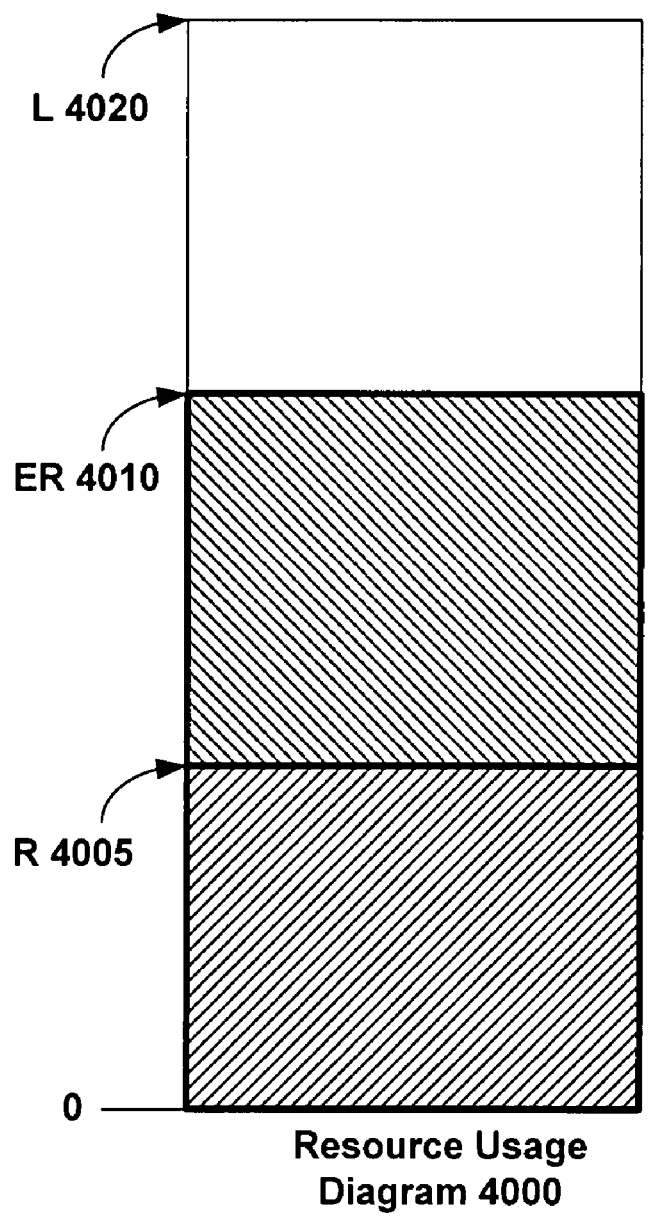
FIG. 4a depicts a resource usage diagram, in accordance with one embodiment.
Figure 4B:
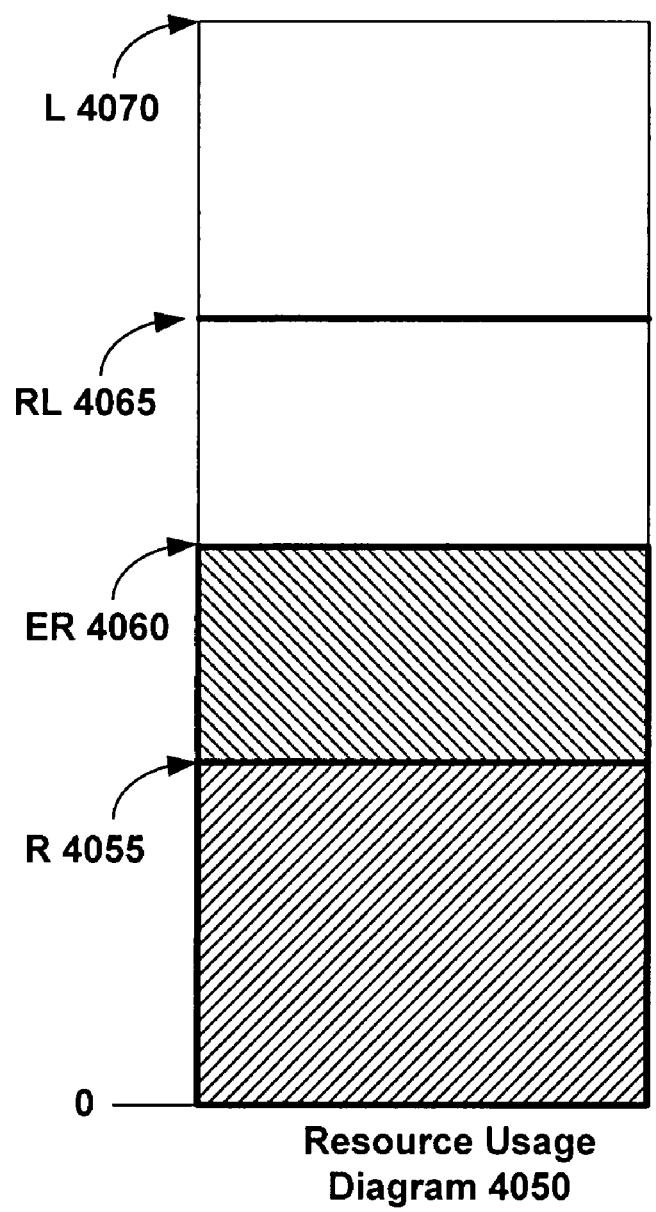
FIG. 4b depicts a resource usage diagram, in accordance with one embodiment.

With reference now to FIG. 4a, a resource usage diagram 4000 is depicted, in accordance with one embodiment. While resource usage diagram 4000 is shown as incorporating specific, enumerated features, it is understood that embodiments are well suited to application with fewer, additional, or different features or configurations.

As shown in FIG. 4, the resources reserved by the node may vary. The reservation value, R 4005, sets a minimum amount of resources that are guaranteed to be available to the node. In some embodiments, for example, a virtual machine will not be allowed to start, unless certain minimum resource guarantees can be made, e.g., unless R can be satisfied for that new node.

During the operation of the consumer, it may become desirable for that consumer to have additional resources reserved for its use, e.g., because the consumer is performing some resource intensive task, or because a child of the consumer now requires additional reserved resources. Provided that a request for additional reserved resources is successful, the effective reservation of the consumer may change, e.g., ER 4010 is greater than the minimum reservation, R 4005.

In some embodiments, an allocation limit, or simply a limit, may be defined for a particular node or consumer. In such embodiments, the resources reserved by the consumer are not allowed to exceed that limit. Further, in some embodiments, a consumer may be allocated additional unreserved resources when they are available; in several such embodiments, the total resources both reserved and unreserved used by a consumer are not allowed to exceed the defined limit. For example, ER 4010 may vary between R 4005 and L 4020, but it will not be allowed to exceed L 4020. Further, the node represented by resource usage diagram 4000 may be allocated additional, unreserved resources, but those unallocated resources plus ER 4010 will not be allowed to exceed limit 4020.

In some embodiments, several additional attributes are utilized. These attributes may be defined for each consumer node, or may be derived from other attributes. A number of such attributes are specified below, in Table 2. The relationship between some of these attributes is depicted in FIG. 4b.

TABLE 2

| Attribute | Symbol | Description |
| --- | --- | --- |
| Reservation Limit | RL | Upper-bound for reservation expansion |
| Effective Reservation Limit | ERL | Actual upper-bound for resource expansion |
| Shares | SH | Proportional share in allocated, unreserved resources |

With reference now to FIG. 4b, a resource usage diagram 4050 is depicted, in accordance with one embodiment. While resource usage diagram 4050 is shown as incorporating specific, enumerated features, it is understood that embodiments are well suited to application with fewer, additional, or different features or configurations.

In some embodiments, a reservation limit may also be set. In these embodiments, the reservation limit provides an upper bound on the resources that a consumer may attempt to reserve. For example, R 4055 represents the minimum guarantee of resources, while RL 4065 sets the maximum amount of the resources that the consumer will attempt to reserve. In several such embodiments, the reservation limit is distinct from the (allocation) limit described previously. In such embodiments, there is no link between the two attributes. The reservation limit defines a cap on the resources that may be reserved by a client; the limit is a cap on the resources that may be utilized by the consumer, regardless of whether those resources are reserved for the consumer or not.

In some embodiments, the effective reservation limit is the actual amount of resources that the consumer will be allowed to reserve. In some cases, the effective reservation limit will be equal to the reservation limit. In other cases, where the reservation limit is set higher than the limit for the consumer, the effective reservation limit is equal to the limit for that consumer. Expressed mathematically, ERL=min(RL, L); the effective reservation limit is the minimum of the reservation limit and the limit. As shown, RL 4065 is less than L 4070; accordingly, the ERL for this node is equal to RL 4065. The node may also have unreserved resources allocated to it for temporary use, up to L 4070. These unreserved resources are not guaranteed, and may be taken away to meet other reservation requirements.

Expandable Reservations and Tree Hierarchies

In the following Figures, embodiments are depicted in which the resources of a system organized in a tree hierarchy are modified. As nodes are added or removed from the tree, the amount of reserved resources may vary. This allows for a more flexible system, in that unused resources can be progressively reserved by active consumers, but the option remains to reserve a minimum level of resources for other potential consumers.

In some embodiments, reservations for a resource pool are reserved at the time of the creation of the resource pool, e.g., on behalf of the future potential children. Resource reservation for a particular node, e.g., a virtual machine, may not need to occur until that node is added to the tree, e.g., powered on. Additionally, in some embodiments, when a node is removed from the tree, the resources reserved for that node may be released back to the parent, and potentially from there back up the tree to the root node.

Figure 5A:
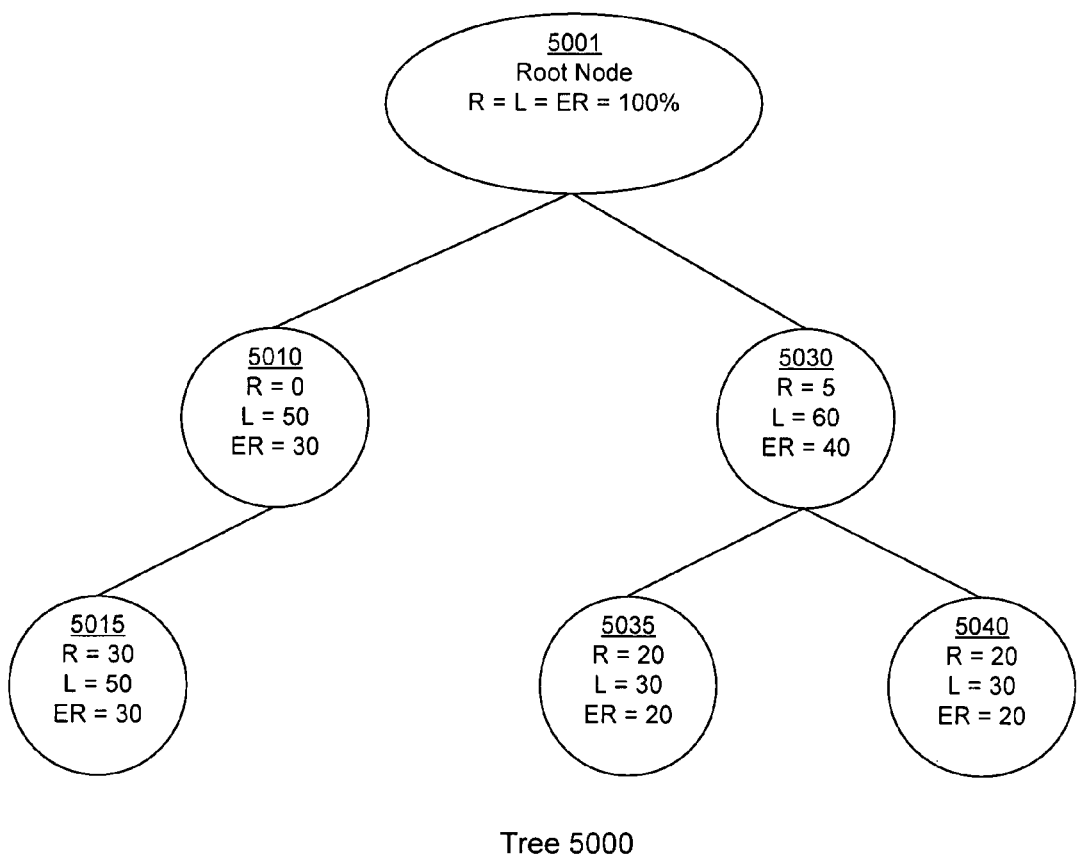
FIG. 5a depicts a tree hierarchy, in accordance with one embodiment.
Figure 5B:
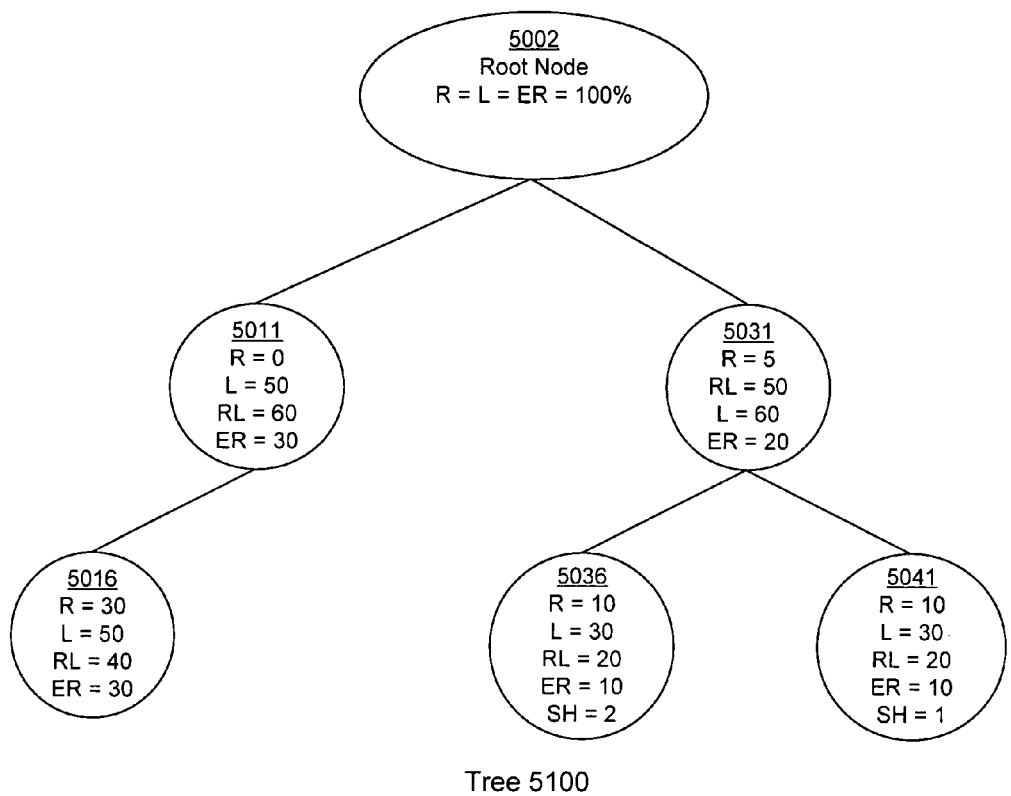
FIG. 5b depicts a tree hierarchy, in accordance with one embodiment.
Figure 5C:
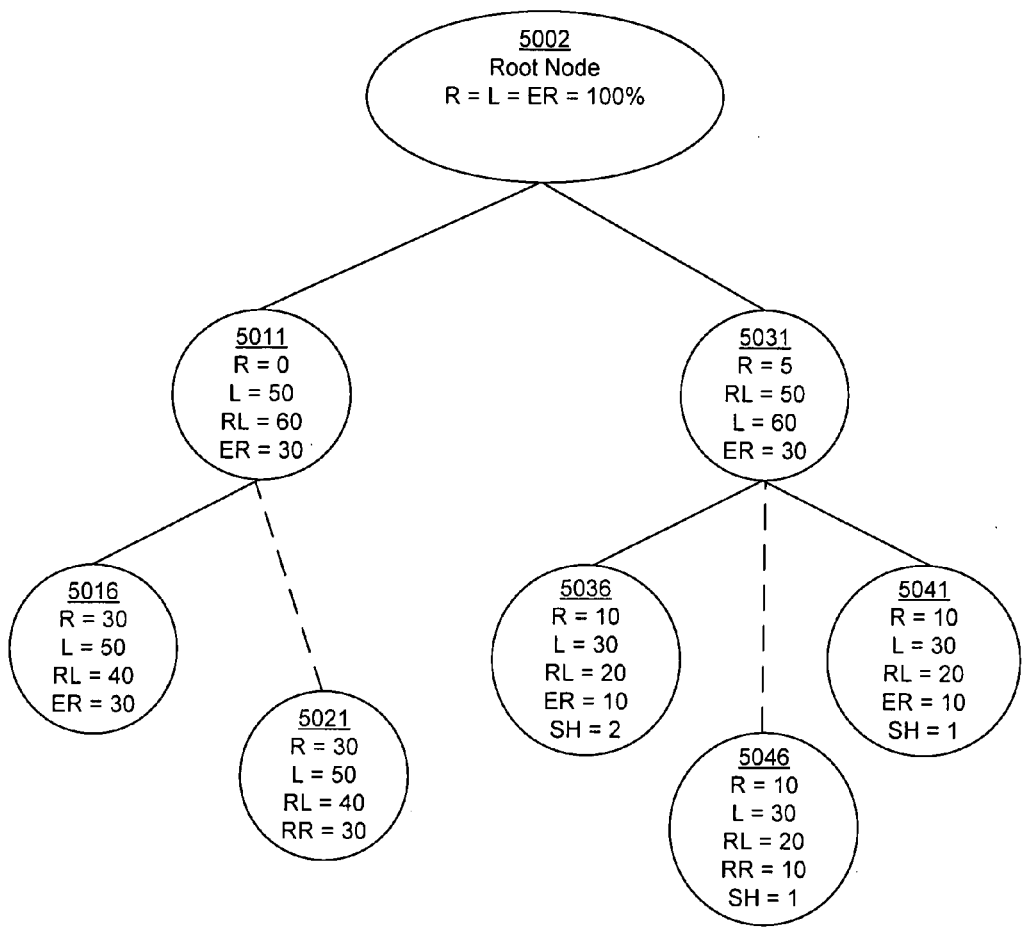
FIG. 5c depicts a tree hierarchy, in accordance with one embodiment.

It is understood that while the embodiments described in FIGS. 5a-5c utilize absolute percentages of system resources to express the values of attributes associated with nodes, embodiments are well suited to other applications, e.g., using actual values of system resources to reserve, or using relative percentages of resources available to a parent node. Different embodiments utilize different approaches.

With reference now to FIG. 5a, a tree 5000 is depicted, in accordance with one embodiment. While tree 5000 is shown as incorporating specific, enumerated features, it is understood that embodiments are well suited to application with fewer, additional, or different features or configurations.

As shown in FIG. 5a, tree 5000 begins with root node 5001. In the depicted embodiment, root node 5001 is the ultimate parent of all other nodes within the tree. Effectively, root node 5001 has a reservation for all of the resources available to the system.

Tree 5000 branches at root node 5001 into nodes 5010 and 5030. Node 5010, in the depicted embodiment, has a minimum reservation of zero, and a limit of 50% of total system resources. Node 5030 has a minimum reservation of 5%, and a limit of 60%. In some embodiments, as in the depicted embodiment, nodes 5010 and 5030 may be resource pools. In other embodiments, node 5030 may be both consumer, reserving resources for its own use, and a resource pool, reserving resources on behalf of its children.

Node 5010 is shown as having one active child, node 5015. Node 5015 has a minimum reservation of 30%, and a limit of 50%. Node 5030 has two active children, nodes 5035 and 5040. Each of these nodes has a minimum reservation of 20%, and a limit of 30%.

In the depicted embodiment, reservations are expandable, e.g., the reservation of a child node is allowed to expand, even beyond the current reservation of its parent, provided resources are available for reservation. When reserving resources, in some embodiments, a resource manager for tree 5000 would first meet the minimum reservation requirements of the nodes in the tree. From the perspective of root node 5001, therefore, the reservation requirements for nodes 5010 and 5030 must be met first. In order to determine the reservation requirements for these nodes, the reservation requirements of their children are also determined. In the depicted embodiment, the reservation requirement (RR) for any particular node can be defined as the greater of either the reservation for that node, or the sum of the reservations for its children; e.g., max(reservation of parent, sum(reservation of child1+ . . . +reservation of childN)). In other embodiments, e.g., where a node is both a consumer in its own right and a parent, the required reservation may include the sum of the parent's required resources, plus those of its children.

Accordingly, the RR for node 5010 is equal to the greater of the reservation for node 5010, which is zero, or the reservation for its children, 30% for node 5015. Similarly then, for node 5030, RR=max (5%, (20%+20%))=40%.

As shown, nodes 5010 and 5030 have effective reservations equal to their required reservation. If the required reservation changes, e.g., a new child node is added, an existing node is removed, or the reservation for a node attempts to change, the parent node will try to change its effective reservation, as necessary.

With reference now to FIG. 5b, a tree 5100 is depicted, in accordance with one embodiment. While tree 5100 is shown as incorporating specific, enumerated features, it is understood that embodiments are well suited to application with fewer, additional, or different features or configurations.

Tree 5100, as shown, depicts an embodiment where reservation limits are set for several of the nodes within the tree. Tree 5100 includes root node 5002, which has two children, nodes 5011 and 5031. Node 5011 has a minimum reservation of zero, a reservation limit of 60%, and a limit of 50%. The effective reservation limit (ERL) of node 5011 is therefore set at 50%, the limit on resources available to node 5011. Node 5031 has a reservation of 5%, a reservation limit of 50%, and a limit of 60%.

Node 5011 has one child, node 5016. Node 5016 has a reservation of 30%, a reservation limit of 40%, and a limit of 50%. Accordingly, node 5016 is guaranteed at least 30% of system resources, and may be able to expand its reservation up to a reservation limit of 40%. Should unreserved resources be allocated to node 5016, it will not be allowed to utilize more than 50% of system resources. The effective reservation of node 5011 is presently 30%; this includes the reservation of its children, as well as any resources reserved specifically for node 5011.

In some embodiments, e.g., embodiments where node 5031 does not consume resources for itself, resources reserved by the parent node may be available to a child node. For example, as node 5031 does not need the 5% reserved resources for its own use; it may use those 5% to partially meet the reservation requirement for node 5041. In this way, a resource pool can reserve resources for its children, even before its children are added to the tree.

Node 5031 has two children, nodes 5036 and 5041. Each of these child nodes has a reservation for 10%, a reservation limit of 20%, and a limit of 30%. The effective reservation (ER) of node 5031, in the depicted embodiment, is 20%; this includes the reservation for its two children.

Node 5036, however, has been allocated two shares, while node 5041 has only one share. In some embodiments, shares are used to determine a proportionate split of available, unreserved resources. Therefore, while both nodes will be allowed no more than 30% of system resources, if node 5031 has unreserved resources available to allocate to its children, if both nodes are allocated resources beyond their reservations, node 5036 will receive twice as many resources as node 5041. In other embodiments, different methods of allocating available, unreserved resources may be utilized.

Changing the Required Reservation

With reference now to FIG. 5c, a tree 5200 is depicted, in accordance with one embodiment. While tree 5200 is shown as incorporating specific, enumerated features, it is understood that embodiments are well suited to application with fewer, additional, or different features or configurations.

Tree 5200 depicts tree 5100, after several changes to nodes have occurred. Specifically, an attempt was made to add a new child node for each of nodes 5011 and 5031, nodes 5021 and 5046, respectively.

When attempting to increase the effective reservation of a particular node, several checks occur. One such check is ensuring that the change in the effective reservation will not cause the node to exceed its effective reservation limit. Another check is to determine whether the node can reserve adequate additional resources, to meet the required reservation. In some embodiments, this check may involve recursively climbing a tree hierarchy, examining each parent node in turn until either adequate resources are reserved, or the root node is reached and the attempt fails.

Node 5021, as shown, has a minimum reservation of 30%, a reservation limit of 40%, and a limit of 50%. In order for node 5021 to be successfully added to tree 5200, the required reservation for node 5011 would have to be available. In the depicted scenario, node 5021 cannot be successfully added to tree 5200, because the required reservation cannot be met. Specifically, the ERL for node 5011 is 50%; the RR for node 5011 would be 60%, the sum of the reservations of its children. The attempt to add node 5021 returns a failure.

Node 5046, as shown, has a reservation of 10%, a reservation limit of 20%, a limit of 30%, and a share of 1. When the attempt is made to add node 5046 to tree 5200, the required reservation for node 5031 is equal to 30%: the greater of either node 5031's own reservation, or the sum of the reservation of each of its two existing children (at that time) and the reservation of the new node. Node 5031's effective reservation is presently 20%, so the required reservation for the new child cannot be met by the immediate parent. Node 5031 will therefore attempt to increase its effective reservation from 20% to 30%. Because adequate unreserved resources exist in the system, and because the increase in the effective reservation does not exceed the reservation limit, this attempt succeeds.

In some embodiments, when a node is removed from a tree, or, more generally, when the required reservation for a node declines, e.g., when a consumer no longer requires as many reserved resources, the effective reservation of that node may decrease. Similarly, if the required reservation of a child node decreases, the effective reservation of the parent node may be able to decrease as well.

In some embodiments, multiple changes to the required reservation of a single node may occur, e.g., a child node is added, while the required reservation of another child node increases. In some embodiments, these alterations are handled sequentially, in chronological order. In other embodiments, alternative means of resolving operational order may be utilized, e.g., weighting based on shares, or a bias towards adding new children over increasing the reservation for existing ones.

Method of Reserving Resources

Figure 6:
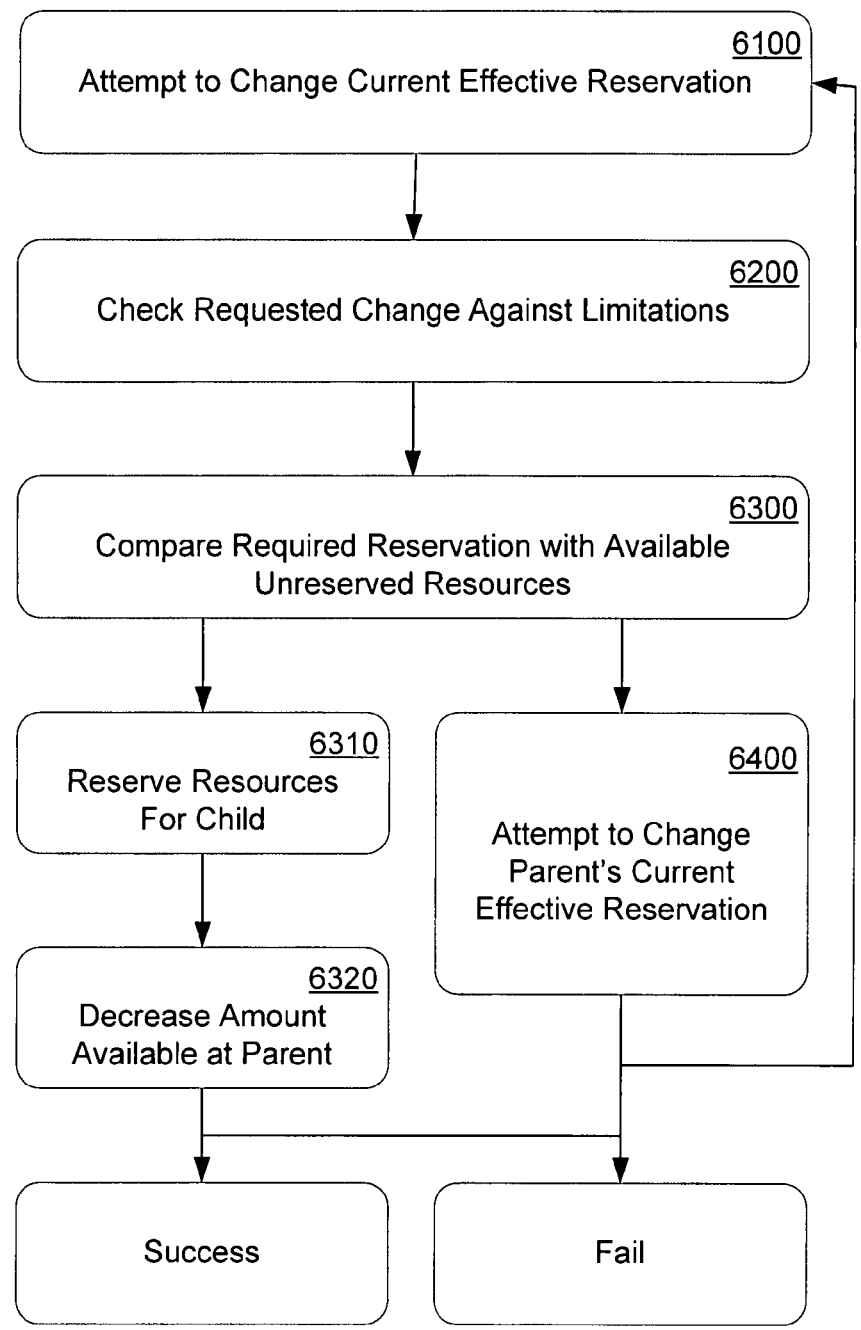
FIG. 6 is a flowchart of a method of reserving resources, in accordance with one embodiment.

With reference now to FIG. 6, a flowchart 6000 of a method of reserving resources is depicted, in accordance with one embodiment. Although specific steps are disclosed in flowchart 6000, such steps are exemplary. That is, embodiments of the present invention are well suited to performing various other (additional) steps or variations of the steps recited in flowchart 6000. It is appreciated that the steps in flowchart 6000 may be performed in an order different than presented, and that not all of the steps in flowchart 6000 may be performed.

With reference to step 6100, a child node attempts to change its current effective reservation. The motivation for this change will vary, across different embodiments. For example, if the child node is added to a tree hierarchy, the effective change is from zero to the node's defined minimum reservation. If the child node is being removed from the tree hierarchy, the effective change is from its ER to zero. If the child node requires additional reserved resources, or fewer reserved resources, the change will be from ER to RR.

With reference to step 6200, the attempted change is checked against any applicable limitations. In different embodiments, different error checking and limit condition checking operations may be performed. For example, if the child node has a defined reservation limit, and the attempted change would exceed the reservation limit, the attempted change should fail. Similarly, if the attempted change would cause the parent node for that child node to exceed its ERL, the change should fail.

With reference to step 6300, the required reservation of the parent node is compared with the parent's ER. In some embodiments, the required reservation of the parent node is the sum of the required reservations for each of its children, plus any required reservation on its own behalf, modified by the desired change. In other embodiments, the required reservation of the parent node is the sum of the required reservations of its children.

With reference to step 6310, the parent reserves adequate resources for the child to sustain the attempted change, if those resources are available. In some embodiments, a parent node may have an effective reservation in excess of its required reservation, e.g., a parent node has a minimum reservation which exceeds the required reservation. In this case, the parent node can use those excess reserved resources to meet the needs of the attempted change.

With reference to step 6320, the amount of resources available at the parent are modified accordingly. In some embodiments, the resources reserved by a particular parent node can be tracked, and their disposition to child nodes similarly noted, e.g., by a resource manager. In some embodiments, the functions of this step are implicitly applied by successfully changing the reservation of the child node. In some embodiments, e.g., where the method is performed recursively, some or all of the nodes in the path between the original requester and the top node satisfying the request will similarly need to modify the resources available accordingly.

With reference to step 6400, the parent node attempts to change its own effective reservation. In some embodiments, if the parent node does not have the necessary resources reserved to satisfy the attempted change, it will attempt to change its own effective reservation, in order to obtain further resources from its parent. In some embodiments, the parent may be able to partially satisfy the attempted change, e.g., has a portion of the resources necessary for the change already reserved. In several such embodiments, those resources will not be reserved for the child, unless all of the necessary resources are first reserved.

In some embodiments, the method of flowchart 6000 repeats recursively, with the preceding iteration's parent node being treated as the child node for the next iteration. This iterative process continues, until either enough resources are reserved to satisfy the attempted change, or the recursion reaches the root node for the system. In other embodiments, other approaches may be utilized. For example, in one embodiment, recursion may be limited to a specified number of layers of the tree, e.g., such that the child is not allowed to make changes if it would require changes in effective reservations more than three levels up the tree.

Process Resource Reservation Management

In some embodiments, this approach is utilized for managing processes on a computer system, or a cluster of computers. In several such embodiments, different organizational schemes can be used to manage resources. One such embodiment is described below, with reference to FIGS. 7 and 8.

Figure 7:
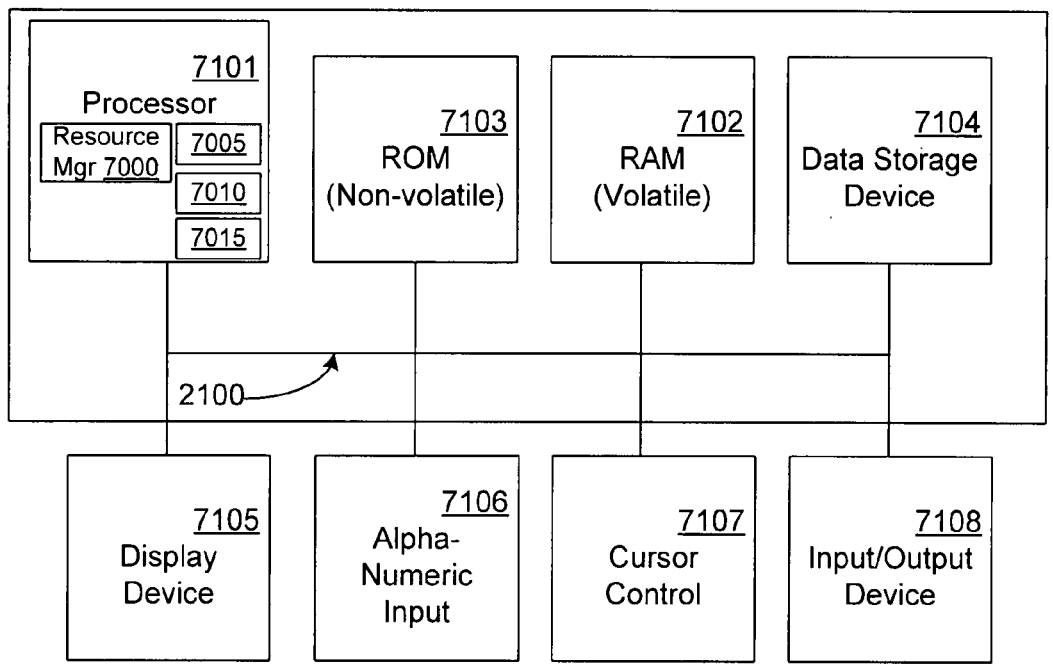
FIG. 7 is a block diagram of a computing system, in accordance with one embodiment.

With reference to FIG. 7, a computing system 7112 is depicted, in accordance with one embodiment. While system 7112 is shown as incorporating specific, enumerated features, it is understood that embodiments are well suited to application with fewer, additional, or different features or configurations.

In the depicted embodiment, the physical elements of system 7112 are similar to those of system 2112. However, as shown in FIG. 7, a resource manager 7000 is executing on processor 7101. Resource manager 7000, in the depicted embodiment, is for managing access to the resources of system 7112, e.g., processor cycles, memory allocation, data storage device allocation, and similar operations. FIG. 7 also depicts a number of processes, e.g., processes 7005, 7010, and 7015, executing on processor 7101.

Figure 8:
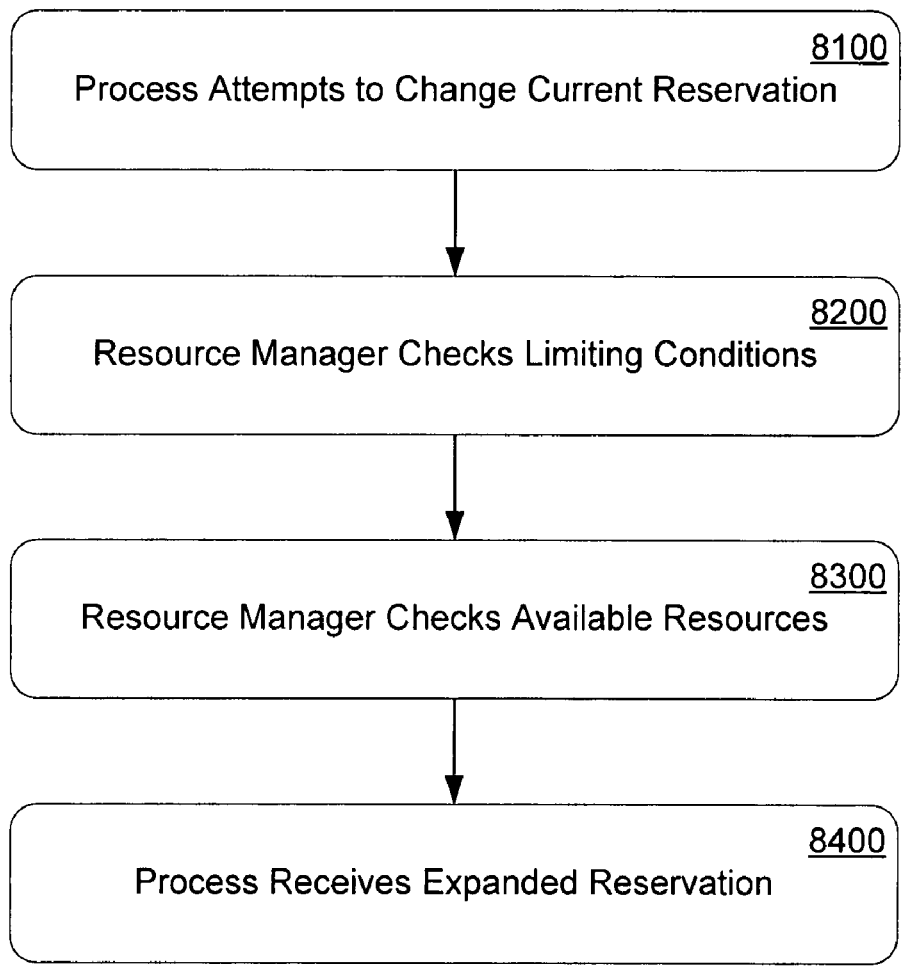
FIG. 8 is a flowchart of a method of managing resource reservation for processes, in accordance with one embodiment.

With reference to FIG. 8, a flowchart 8000 of a method of managing resource reservation for processes is depicted, in accordance with one embodiment. Although specific steps are disclosed in flowchart 8000, such steps are exemplary. That is, embodiments of the present invention are well suited to performing various other (additional) steps or variations of the steps recited in flowchart 8000. It is appreciated that the steps in flowchart 8000 may be performed in an order different than presented, and that not all of the steps in flowchart 8000 may be performed.

With reference to step 8100, a process attempts to change its current reservation. In some embodiments, as described above, processes reserve resources when they are started. In several such embodiments, the resources reserved by a process are allowed to expand when necessary, provided that adequate resources exist, and no limitations will be exceeded. In some embodiments, a process will notify a resource manager, when attempting to reserve additional resources.

For example, with reference to FIG. 7, process 7005 requests additional reserved RAM from resource manager 7000.

With reference to step 8200, the resource manager checks limiting attributes. In some embodiments, as described above, a process may have a limit attribute associated with it, detailing the maximum amount of a particular resource the process is allowed to utilize. Additionally, in some embodiments, a process may have a reservation limit attribute associated with it, detailing the maximum amount of a particular resource a process is allowed to reserve. Moreover, in some embodiments, an effective reservation limit may be calculated from the limit and the resource limit attributes. In other embodiments, other limitations may exist. If granting the request would violate one of these limiting attributes, the request fails.

For example, resource manager 7000 checks the request against the limit attribute and the effective reservation limit associated with process 7005. If the request for additional RAM would cause process 7005's effective reservation to exceed its limit or effective reservation limit, the request fails.

With reference to step 8300, the resource manager determines if resources are available to satisfy the request. In some embodiments, the resource manager determines if adequate unreserved resources are available to fulfill the request. If they are not, the request fails. In several embodiments, the resources available to the resource manager may vary. For example, in some embodiments, the resource manager manages all the resources of the system. In other embodiments, the resource manager may only manage a portion of the resources of the system, e.g., the resource manager is responsible for managing the resources of one resource pool, while other resource managers handle other resources in the system. Also, in some embodiments, resources must be both unreserved and unused, in order to be considered available; in such embodiments, unreserved resources that are in use will not be reclaimed, in order to increase a reservation. In other embodiments, availability is determined in other ways.

For example, resource manager 7000 checks the current reservation and usage of RAM 7102, to determine if sufficient unreserved and unused RAM is available, With reference to step 8400, the additional resources necessary to fulfill the request are reserved for the process. In some embodiments, the step includes the resource manager updating a listing of available resources.

For example, resource manager 7000 reserves additional RAM from RAM 7102 for process 7005.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of managing computing resource reservations in a computing system, said computing system having a total amount of computing resources, the method comprising:
    reserving a first reservation amount of computing resources for a consumer, wherein said first reservation amount is expandable to a reservation limit assigned to said consumer and said first reservation amount is a current amount of resources reserved by said consumer;
    receiving, at a parent node that is a parent to said consumer in a hierarchy, a request to change from the first reservation amount of computing resources to a second reservation amount of computing resources;
    determining whether said second reservation amount exceeds said reservation limit assigned to said consumer;
    if said second reservation amount exceeds said reservation limit, disallowing said request to change;
    if said second reservation amount does not exceed said reservation limit, performing:
        comparing said second reservation amount with available computing resources, said available computing resources being computing resources not reserved from said total amount of computing resources in said computing system;
        changing a third reservation amount at said parent node to reserve additional computing resources from a grandparent node that is a parent of said parent node in said hierarchy if said parent node does not have enough computing resources reserved to satisfy said second reservation amount, said third reservation amount being a current amount of resources reserved by said parent node;
        reserving said second reservation amount for said consumer from said additional computing resources.

2. The method of claim 1, wherein said request comprises an increase from said first reservation amount to said second reservation amount.

3. The method of claim 1, wherein said request comprises a decrease from said first reservation amount to said second reservation amount.

4. The method of claim 1, wherein said comparing comprises:
    determining if resources associated with said parent node in said hierarchy are sufficient to satisfy said change, said request causing said parent node to reserve additional available resources for said consumer.

5. The method of claim 1, wherein said reservation limit comprises a maximum allowable resource reservation.

6. A non-transitory computer-usable medium having computer-readable program code embodied therein for causing a computer system to execute a method of managing computing resource reservation in a tree hierarchy, said computing resources being included in a computing system, the method comprising:
    receiving a first reservation request from a child node for a parent node in said tree hierarchy, said first reservation request comprising a first change in a first current reservation of computing resources associated with said child node, said first current reservation of computing resources being a current amount of computing resources reserved by said child node;
    determining whether said first change is allowable to said child node based on a reservation limit associated with said child node;
    if said first change is allowable for said child node, determining if a second current reservation of computing resources for said parent node includes enough available computing resources to accommodate said first change, said second current reservation being a current amount of computing resources reserved by said parent node;
    if said second current reservation of computing resources for said parent node does include enough available computing resources to accommodate said first change, reserving, for said child node, resources already reserved by said parent node in said second current reservation; and
    if said second current reservation of computing resources for said parent node does not include enough available computing resources to accommodate said first change, said first reservation request from said child node causing generation of a second reservation request for said parent node to a grandparent node that is a parent of said parent node, said second reservation request comprising a second change in said second current reservation associated with said parent node to allow said parent node to reserve resources for said child node.

7. The computer-usable medium of claim 6, further comprising:
    receiving said second reservation request from said parent node;
    determining whether said second change is allowable;
    comparing said second change with a third current reservation of computing resources associated with said grandparent node; and
    reserving said resources for said parent node at said grandparent node if enough available resources in said third current reservation of computing resources are available for said second change.

8. The computer-usable medium of claim 7, further comprising:
    generating a third reservation request, said third reservation request comprising a third change in the current reservation associated with said grandparent node.

9. The computer-usable medium of claim 6, further comprising:
    recursively traversing nodes in said tree hierarchy, until current reservations for each node are changed such that an amount of resources sufficient to satisfy said first reservation request are reserved.

10. The computer-usable medium of claim 6, wherein said determining if said first change is allowable comprises:
    examining an attribute for said reservation limit associated with said child node.

11. A method of providing expandable resource reservations, comprising:
defining a minimum computing resource reservation and a maximum reservation limit for a consumer, said minimum computing resource reservation being a minimum amount of computing resources that are guaranteed for said consumer in a computing system and said maximum reservation limit being a maximum amount of computing resources that can be reserved by said consumer in said computing system;
reserving said minimum computing resource reservation for said consumer, wherein said minimum computing resource reservation is a current amount of computing resources reserved by said consumer;
receiving a request for an expanded computing resource reservation for said consumer after reserving said minimum computing resource reservation;
examining an attribute associated with said consumer, said attribute comprising said maximum reservation limit associated with said consumer, wherein a total of maximum reservation limits for a plurality of consumers in said computing system exceeds a total amount of computing resources in a resource pool;
if said expanded computing resource reservation does not exceed said maximum reservation limit associated with said consumer, performing:
determining if an amount of computing resources are available in said resource pool, such that said expanded computing resource reservation could be satisfied;
if said amount of computing resources is available in said resource pool, changing a computing resource reservation for a parent node that is a parent to said consumer in a hierarchy to reserve additional computing resources from a grandparent node that is a parent of said parent node in said hierarchy, if said parent node does not have enough computing resources reserved to satisfy said expanded computing resource reservation, said additional computing resources used to reserve said expanded computing resource reservation for said consumer, said computing resource reservation for said parent node being a current amount of computing resources reserved by said parent node; and
if said amount of computing resources is not available in said resource pool, disallowing said expanded computing resource reservation.

12. The method of claim 11, wherein said minimum computing resource reservation is zero.

13. The computer-usable medium of claim 6, further comprising:
if said second current reservation of computing resources for said parent node does not include enough available computing resources to accommodate said first change, comparing said first change with a second reservation limit associated with said parent node, said second reservation limit being an upper bound of computing resource reservation allowed to said parent node; and
not generating said second reservation request if said first change causes said second reservation limit to be exceeded.

14. A method of managing computing resource reservation in a tree hierarchy, said computing resources being included in a computing system, the method comprising:
receiving a first reservation request from a child node at a parent node in said tree hierarchy, said first reservation request comprising a first change in a first current reservation of computing resources associated with said child node, said first current reservation of computing resources being a current amount of computing resources reserved by said child node;
determining whether said first change is allowable to said child node based on a reservation limit associated with said child node;
if said first change is allowable for said child node, determining if a second current reservation of computing resources for said parent node includes enough available computing resources to accommodate said first change, said second current reservation being a current amount of computing resources reserved by said parent node;
if said second current reservation of computing resources for said parent node does include enough available computing resources to accommodate said first change, reserving, for said child node, resources already reserved by said parent node in said second current reservation; and
if said second current reservation of computing resources for said parent node does not include enough available computing resources to accommodate said first change, said first reservation request from said child node causing generation of a second reservation request for said parent node to a grandparent node that is a parent of said parent node, said second reservation request comprising a second change in said second current reservation associated with said parent node to allow said parent node to reserve resources for said child node.

15. The method of claim 14, further comprising:
receiving said second reservation request from said parent node;
determining whether said second change is allowable;
comparing said second change with a third current reservation of computing resources associated with said grandparent node; and
reserving said resources for said parent node at said grandparent node if enough available resources in said third current reservation of computing resources are available for said second change.

16. The method of claim 15, further comprising generating a third reservation request, said third reservation request comprising a third change in the current reservation associated with said grandparent node.

17. The method of claim 14, further comprising recursively traversing nodes in said tree hierarchy, until current reservations for each node are changed such that an amount of resources sufficient to satisfy said first reservation request are reserved.

18. The method of claim 14, wherein said determining comprises examining an attribute associated with said child node.

* * * * *